United States Patent [19]

Howard et al.

[11] 4,447,270

[45] May 8, 1984

[54] PIGMENTS AND THEIR PREPARATION BY COATING WITH OXIDES OF ZR-SI-AL

[75] Inventors: Peter B. Howard; Derek O'Donnell, both of Cleveland, England

[73] Assignee: Tioxide Group PLC, Cleveland, England

[21] Appl. No.: 428,868

[22] Filed: Sep. 30, 1982

[30] Foreign Application Priority Data

Oct. 30, 1981 [GB] United Kingdom ............... 8132844

[51] Int. Cl.$^3$ ............................................. C09C 1/36
[52] U.S. Cl. ................... 106/300; 106/308 B; 106/309
[58] Field of Search ............... 106/308 B, 300, 309

[56] References Cited

U.S. PATENT DOCUMENTS

| | | | |
|---|---|---|---|
| Re. 27818 | 11/1973 | Werner | 106/300 |
| 2,885,366 | 5/1959 | Iler | 106/300 |
| 3,552,995 | 1/1971 | Powell | 106/308 B |
| 3,650,793 | 3/1972 | Goodspeed et al. | 106/308 B |
| 4,125,412 | 11/1978 | West | 106/300 |
| 4,222,789 | 9/1980 | Jacobson | 106/300 |
| 4,328,040 | 5/1982 | Panek et al. | 106/308 B |

FOREIGN PATENT DOCUMENTS

| | | | |
|---|---|---|---|
| 990457 | 6/1976 | Canada | 106/300 |
| 1368601 | 10/1974 | United Kingdom | 106/300 |
| 1179171 | 1/1970 | United Kingdom . | |
| 1507710 | 4/1976 | United Kingdom . | |
| 1435718 | 5/1976 | United Kingdom . | |
| 1541621 | 3/1979 | United Kingdom . | |
| 1589070 | 5/1981 | United Kingdom . | |

*Primary Examiner*—Helen M. McCarthy
*Attorney, Agent, or Firm*—Banner, Birch, McKie & Beckett

[57] ABSTRACT

Titanium dioxide pigment of improved durability in paints comprises a particulate core of rutile titanium dioxide having an inner coating on the core of an oxide or hydrous oxide of zirconium, and a coating of dense amorphous silica on the inner coating. The pigment optionally has an outer coating of a hydrous oxide of aluminium.

The pigments contain the oxide of hydrous oxide of zirconium in an amount of up to 5% expressed as $ZrO_2$ and an amount of dense amorphous silica of up to 12% by weight expressed as $SiO_2$ on the weight of $TiO_2$.

The pigments when incorporated in paints have extremely high durability.

12 Claims, No Drawings

PIGMENTS AND THEIR PREPARATION BY COATING WITH OXIDES OF ZR-SI-AL

This invention relates to improved pigments and their preparation and particularly to titanium dioxide pigments.

Titanium dioxide pigments particularly rutile titanium dioxide are valuable materials for pigmenting a wide variety of products such as paints which in use are required to exhibit a high degree of so-called durability in withstanding degradation of the product by the action of light. There is a desire always for improvements in pigments and paint media to increase the durability and to extend the effective life of the products.

According to the present invention a titanium dioxide pigment of improved durability comprises particulate pigmentary titanium dioxide having an inner coating on a core of rutile titanium dioxide of an oxide or hydrous oxide of zirconium in an amount of up to 5% by weight expressed as $ZrO_2$ on weight of $TiO_2$ and a coating of dense amorphous silica in an amount of up to 12% by weight expressed as $SiO_2$ on weight of $TiO_2$ carried on the inner coating and optionally an outer coating containing a hydrous oxide of aluminium in an amount of up to 6% by weight expressed as $Al_2O_3$ on the weight of $TiO_2$.

The present invention provides a pigment having an improved resistance to photochemical degradation i.e. a pigment having an improved durability. The coating of the core of pigmentary rutile titanium dioxide with an inner coating of an oxide or hydrous oxide of zirconia and then with the dense silica improves the durability by a margin which will be unexpected to those well skilled in the properties of titanium dioxide pigments.

The coating of dense silica is substantially non-porous and amorphous. The coating of dense silica is deposited from an alkaline solution and preferably from a solution of a soluble silicate at a pH greater than 8, most preferably at a pH of from 9 to 11.

The deposition of the dense silica results from the addition to an alkaline solution of the soluble silicate of a mineral acid such as sulphuric acid which hydrolyses the silicate in solution to amorphous silica. For instance a solution of a soluble silicate can be mixed with an alkaline slurry of core particles of pigmentary titanium dioxide already coated with the inner coating and then slowly acidified to deposit dense amorphous silica. Alternatively there can be added to a slurry of the zirconia treated core particles of titanium dioxide an alkaline solution of a water-soluble silicate and simultaneously a mineral acid to maintain the pH of the slurry at a value greater than 8, say 9 to 10.5 to form and deposit the required dense silica coating.

Generally the temperature of the slurry is maintained at from 60° to 100° C., preferably from 70° C. to 90° C. during formation of the dense silica and the slurry will be stirred to maintain effective coating.

Any suitable water soluble silicate can be used as the source of dense silica although preferably an alkali metal silicate is employed. Particularly useful are sodium and potassium silicates.

Prior to the formation of the coating of dense silica the core of pigmentary titanium dioxide is coated with an oxide or hydrous oxide of zirconium.

The chosen core particles are formed by either the "sulphate" (in which the product has been calcined) or, preferably, by the "chloride" process for the manufacture of titanium dioxide pigments operated in such a way as to produce a product of pigmentary size in which the majority of the titanium dioxide is in the rutile modification. Usually at least 95% by weight of the titanium dioxide is rutile and preferably at least 97% is of the rutile modification. The "chloride" process involves the vapour phase oxidation of a titanium halide to produce directly pigmentary titanium dioxide (often referred to as pyrogenic titanium dioxide).

If desired, the particulate core material can be coated with an inner coating of an oxide of zirconium by a vapour phase coating technique in which an oxidisable zirconium compound is added to a gaseous dispersion of the particulate material and oxidized by an oxygen containing gas to form and deposit on the particulate core the required inner coating. This procedure is of particular use when the pigment is manufactured by the "chloride" process.

The core material obtained by the "chloride" or "sulphate" process (including a core already coated with zirconia in the vapour phase) usually will be in the form of a dry reactor discharge in the case of the "chloride" process or a dry calciner discharge in the case of the "sulphate" process. The core material can be milled, if desired, by, for example, fluid energy milling with steam prior to formation into an aqueous dispersion.

Some core materials produced by the "chloride" process are self-dispersing on agitation with water whereas others are more easily dispersed by agitation in the presence of a dispersing agent as are "sulphate" produced core materials. Suitable dispersing agents are inorganic or organic compounds such as alkali metal silicates e.g. sodium silicate, phosphates such as the hexametaphosphates and amines such as monoisopropylamine.

The aqueous dispersion or slurry of the core material can be milled prior to treatment to produce the products of the invention for instance by any suitable wet milling process such as in a bead mill but it is preferred to mill the aqueous dispersion in a sand mill. Usually milling of the aqueous dispersion will only be carried out in those cases where the core material has not been milled previously but this need not necessarily be so.

Usually the inner coating is formed on the particulate core material by a wet coating process under alkaline or acidic conditions from a water-soluble zirconium compound in solution in contact with an aqueous dispersion of the core material.

The acid salts of zirconium are particularly useful as sources of the hydrous oxide of zirconium and examples are the zirconium salts of sulphuric, or nitric acids. Zirconium sulphate is the most preferred source. Alternatively ammonium or alkali metal zirconium salts such as ammonium zirconium carbonate can be employed.

Although for the purposes of this invention it is stated that the core material carries a coating of the hydrous oxide of zirconium it is to be clearly understood that this includes those products in which the hydrous oxide of zirconium is associated with the coated core material and need not necessarily surround the whole of the core particle.

Optionally an outer coating of a hydrous oxide of aluminium is provided on the coating of dense silica. It is to be understood that while a coating of the hydrous oxide of aluminium is referred to this hydrous oxide need not necessarily be in the form of a coating and includes the case where the hydrous oxide is associated with the pigment.

The hydrous oxide of aluminium is deposited from any suitable water-soluble source such as the acidic aluminium salts of mineral acids, e.g. aluminium sulphate and aluminium nitrate or from an alkali metal aluminate such as sodium aluminate.

Usually deposition from an acid aluminium compound is effected in alkaline media e.g. by adding an alkali to an aqueous suspension containing the aluminium compound but if desired the aluminium compound and an alkali can be added simultaneously to the suspension to be treated. Acidification of an alkaline aluminium compound will deposit the hydrous oxide of aluminium and in this procedure simultaneous addition of an alkaline aluminium compound and a mineral acid such as sulphuric acid can be employed.

The provision of an outer coating of an hydrous oxide of aluminium has been found to be advantageous in improving the dispersibility and optical properties of the pigmentary product in paints.

The pigment of the present invention is provided with a coating of an oxide or hydrous oxide of zirconium on the core of rutile titanium dioxide in an amount of up to 5% by weight as $ZrO_2$ on $TiO_2$. Usually the minimum amount of oxide or a hydrous oxide of zirconium is 0.5% by weight as $ZrO_2$ and particular advantageous amounts of the oxide or hydrous oxide are 1% to 4% by weight of $TiO_2$.

The amount of dense silica is up to 12% by weight of $TiO_2$ and usually will be at least 2% by weight when expressed as $SiO_2$. Most preferred are pigments containing dense silica in amounts of from 4% to 8% by weight as $SiO_2$ on $TiO_2$.

The optional outer coating of hydrous alumina can be present in an amount of up to 6% by weight as $Al_2O_3$ on $TiO_2$ with preferably 1% to 3% (as $Al_2O_3$) of hydrous alumina being present.

The amounts of the various reagents usable to produce the pigments of the present invention will be readily ascertainable by those skilled in the coating of pigments as also will the concentrations of the various solutions employed.

After completion of the coating process the product can be filtered, washed and dried. If desired the product can be milled in a fluid energy mill prior to packing for sale. Alternatively the product can be sold as a highly concentrated slurry or paste.

The product of the invention can be used to pigment a wide variety of materials, particularly those to be exposed to possible photodegradation. Paints incorporating the pigments exhibit a much improved durability as compared with those incorporating pigments coated with dense silica without a coating of an oxide or hydrous oxide of zirconia and also when compared with those incorporating pigments coated with an oxide or hydrous oxide of zirconia and free of dense silica.

The following Examples illustrate the invention.

EXAMPLE 1

Rutile titanium dioxide reactor discharge obtained from the vapour phase oxidation of titanium tetrachloride in the presence of a small amount of aluminium chloride (2% by weight as $Al_2O_3$ in reactor discharge) was agitated with water to produce an aqueous dispersion containing 400 grams per liter of pigment. The dispersion was sieved to remove particles greater than 45 μm in size.

A portion of the dispersion containing 1200 grams of pigment was diluted to 200 grams per liter of the pigment and the temperature raised to 50° C. The pH of the dispersion was 3.7. An aqueous solution of 110 grams per liter sodium hydroxide was added to the dispersion in an amount (18 mls) sufficient to raise the pH to 5.0.

A solution of zirconium orthosulphate containing 286 grams per liter of the sulphate expressed as $ZrO_2$ was then added in an amount of 46 mls simultaneously with 130 mls of the solution of sodium hydroxide to the stirred aqueous dispersion over a period of 15 minutes while the pH of the dispersion was maintained at 5.0. After the addition of the reagents had been completed the dispersion was stirred for a further 10 minutes. The aqueous dispersion was then heated to 70° C. and sufficient (50 mls) of the aqueous solution of sodium hydroxide added over a period of 15 minutes to raise the pH to a value of 9.4.

An aqueous solution (318 mls) of sodium silicate containing 166 grams per liter expressed as $SiO_2$ was then added to the stirred aqueous dispersion simultaneously with 10% v/v sulphuric acid (105 mls) over a period of 90 minutes to maintain the pH at a value of 9.4. The aqueous dispersion was then stirred while maintaining the temperature at 70° C. for a further 30 minutes.

The heating of the aqueous dispersion was ceased and a further quantity (22 mls) of the 10% v/v sulphuric acid added over a period of 30 minutes to reduce the pH to 7.5. The aqueous dispersion was cooled to 50° C.

To the stirred aqueous dispersion at 50° C. there was then added a solution of sodium aluminate containing the equivalent of 89.3 grams per liter sodium aluminate expressed as $Al_2O_3$ and 218 grams per liter NaOH until the pH reached 10 to 10.5 and then simultaneously with 340 mls of the 10% v/v sulphuric acid to maintain this pH. The total amount of sodium aluminate solution was 296 mls which was added over a total period of 20 minutes. The aqueous dispersion was stirred for a period of 45 minutes after the additions had been completed when the pH was found to have risen to a value of 10.6.

A further amount (90 mls) of the 10% v/v sulphuric acid was then added to the stirred aqueous dispersion to reduce the pH to a value of 6.5 over a period of 30 minutes and then the dispersion was stirred for a further 30 minutes. The treated pigmentary titanium dioxide was filtered, washed, treated with trimethylol propane (0.4% by weight on uncoated pigment) and dried prior to fluid energy milling twice.

The pigment obtained on analysis contained zirconium in an amount of 1.08% as $ZrO_2$, silica in an amount of 3.83% as $SiO_2$ and alumina in an amount of 4.44% as $Al_2O_3$ by weight based on the weight of finished pigment.

EXAMPLE 2

A further sample of the rutile titanium dioxide reactor discharge dispersion described in Example 1 was diluted to 220 grams per liter pigment and the temperature raised to 50° C. The amount of aqueous dispersion was that containing 1200 grams of pigment.

Aqueous sodium hydroxide (110 grams per liter NaOH) (30 mls) was added to the stirred dispersion to raise the pH to a value of 10.0.

A solution of zirconium orthosulphate containing 286 grams per liter of the sulphate expressed as $ZrO_2$ was then added in an amount of 46 mls to the stirred dispersion over a period of 15 minutes. The stirring was continued for a further period of 10 minutes after completion of the addition when the aqueous dispersion had a pH value of 2.0.

An amount (40 mls) of an aqueous sodium hydroxide solution (400 grams per liter NaOH) was added to raise the pH of the dispersion to a value of 9.4 over a period of 15 minutes while stirring.

The stirred aqueous dispersion was then heated to 70° C. and an aqueous solution (318 mls) of sodium silicate containing 166 grams per liter expressed as $SiO_2$ was added simultaneously with aqueous 10% v/v sulphuric acid to maintain the pH at 9.4 over a period of 90 minutes. After the addition had been completed the aqueous dispersion was stirred at 70° C. for a further 30 minutes.

The heating of the aqueous dispersion was ceased and a quantity (25 mls) of the 10% v/v sulphuric acid added to the stirred dispersion over a period of 30 minutes to reduce the pH to a value of 7.5.

The dispersion was then cooled to 50° C. and a solution of sodium aluminate described in Example 1 was added to raise the pH to 10 to 10.5 and then simultaneously with 360 mls of the 10% v/v sulphuric acid to maintain the pH at 10 to 10.5. The total amount of sodium aluminate solution was 296 mls and this was added over a total time of 20 minutes. After the addition had been completed the dispersion was stirred for a further 45 minutes when the pH was 10.5.

A further amount (55 mls) of the 10% v/v sulphuric acid was then added over a period of 30 minutes while stirring to reduce the pH to a value of 6.5. Stirring was continued for a further 30 minutes.

The treated pigmentary titanium dioxide was filtered, washed, treated with trimethylol propane (0.4% by weight on uncoated pigment) and dried prior to milling twice in a fluid energy mill.

On analysis the treated pigment contained zirconium in an amount of 1.06% by weight as $ZrO_2$, silica in an amount of 3.79% by weight as $SiO_2$ and alumina in an amount of 4.46% by weight as $Al_2O_3$ based on weight of finished pigment.

EXAMPLE 3

A portion of an aqueous dispersion containing 1200 grams of a rutile titanium dioxide pigment at a concentration of 220 grams per liter was prepared as described in Example 1.

The aqueous dispersion was heated to 70° C. and the pH adjusted to 9.4 by the addition of 30 mls of 110 grams per liter sodium hydroxide solution.

To the stirred solution there was then added aqueous sodium silicate solution as described in Example 1 in an amount of 318 mls simultaneously with a further quantity of 115 mls of the 10% v/v sulphuric acid over a period of 90 minutes. The pH was maintained at a value of 9.4 during this stage and after addition of the reagents had been completed the dispersion was stirred for a further 30 minutes.

Heating of the dispersion ceased and 25 mls of the sulphuric acid added over a period of 30 minutes to the stirred dispersion to reduce the pH to a value of 7.5.

The dispersion was cooled to 50° C. and sodium aluminate solution containing the equivalent of 89.3 grams per liter $Al_2O_3$ and 218 grams per liter NaOH was added to raise the pH to a value of from 10–10.5 and then simultaneously with 345 mls of the 10% v/v sulphuric acid to maintain the pH at a value of 10 to 10.5. The total amount of sodium aluminate solution added was 286 mls over a total time of 20 minutes. After the additions had been completed the dispersion was stirred for a further 45 minutes when the pH was 10.6 prior to the addition of 85 mls of 10% v/v sulphuric acid to reduce the pH to a value of 6.5 over a period of 30 minutes. The dispersion was stirred for a further 30 minutes after adding the acid.

The treated pigment was then filtered, washed, treated with trimethylol propane (0.4% on weight of uncoated pigment) and dried prior to double milling on a fluid energy mill.

The treated pigment on analysis contained silica in an amount of 3.85% by weight expressed as $SiO_2$, and alumina in an amount of 4.52% by weight as $Al_2O_3$ based on the weight of finished pigment.

This pigment was a control pigment.

The pigments produced in the preceding examples were tested to determine the durability ratio of paints incorporating the pigment.

The durability ratio was measured by exposing a sample of an acrylic/melamine formaldehyde, stoving paint in a weatherometer and determining the weight loss at specified time intervals. A standard pigment incorporated in a similar paint was similarly exposed and the weight loss of the standard paint determined at the specified time intervals. The weight losses of the paint under test at the various specified intervals were plotted against those of the standard paint and the best straight line drawn. The slope of the line (durability ratio) was then determined.

The standard pigment used in the standard paint to determine the durability ratio was selected from commercially available pigments and was one which was considered to have a high durability and acceptable performance in many applications. The pigment was a rutile titanium dioxide prepared by the sulphate process which had been coated with a hydrous oxide of silica in an amount of 1.3% by weight as $SiO_2$, a hydrous oxide of alumina in an amount of 2% by weight as $Al_2O_3$ and a hydrous oxide of titanium in an amount of 1.5% as $TiO_2$ on the weight of pigment.

The results of the measurements are shown in the following Table.

| Pigment of Example No. | Durability Ratio |
| --- | --- |
| 1 | 0.6 |
| 2 | 0.6 |
| 3 | 0.75 |

The above results show that the pigments prepared according to the present invention (Example 1 and Example 2) are superior to the pigment used as a control.

What is claimed is:

1. Titanium dioxide pigments comprising particulate titanium dioxide having (i) an inner coating on a core of rutile titanium dioxide of an oxide or hydrous oxide of zirconium in an amount of from about 1% to about 4% by weight, expressed as $ZrO_2$ by weight of $TiO_2$; (ii) a coating of dense, amorphous silica in an amount of from about 2% to about 12% by weight, expressed as $SiO_2$ by weight of $TiO_2$ carried on the inner coating; and (iii) an outer coating of a hydrous oxide of alumina in an amount of from about 1% to about 6% by weight, expressed as $Al_2O_3$ by weight of $TiO_2$.

2. Titanium dioxide pigment according to claim 1 in which the amount of dense amorphous silica is from 4% to 8% by weight expressed as $SiO_2$ on weight of $TiO_2$.

3. Titanium dioxide pigment according to claim 1 in which the optional outer coating of hydrous alumina is present in an amount of from 1% to 3% expressed as $Al_2O_3$ on weight of $TiO_2$.

4. A process for the manufacture of titanium dioxide pigment that comprises (i) depositing on a particulate core material comprising rutile titanium dioxide an inner coating of an oxide or hydrous oxide of zirconium in an amount of from about 1% to about 4% by weight, expressed as $ZrO_2$ by weight of $TiO_2$; (ii) forming an aqueous dispersion of said coated particles in admixture with a water-soluble silicate and depositing at a pH greater than 8 a dense, amorphous coating of silica on the inner coating on the core particles with the amount of the dense, amorphous silica being deposited in an amount of from about 2% to about 12% by weight, expressed as $SiO_2$ by weight of $TiO_2$; and (iii) depositing from a water-soluble aluminium compound a hydrous oxide of alumina as an outer coating on said pigment after the deposition of said dense, amorphous silica with the amount of the hydrous oxide of alumina being deposited in an amount of from about 1% to about 6% by weight, expressed as $Al_2O_3$ by weight of $TiO_2$.

5. A process according to claim 4 in which the rutile titanium dioxide particulate core material is obtained by the vapour phase oxidation of titanium tetrachloride.

6. A process according to claim 4 in which the rutile titanium dioxide core material is a calcined pigment obtained by the "sulphate" process.

7. A process according to claim 5 in which the inner coating is deposited in the vapour phase by oxidising an oxidisable zirconium compound with an oxygen-containing gas.

8. A process according to claim 4 in which the core material is milled prior to coating with a hydrous oxide of zirconium or prior to coating with the dense amorphous coating of silica.

9. A process according to claim 8 in which the milling is carried out by sand milling.

10. A process according to claim 4 in which the core material having said inner coating in the form of an aqueous dispersion is mixed with an alkaline solution of a silicate and to which is then added a mineral acid to deposit the said dense amorphous coating while maintaining the pH at a value greater than 8.

11. A process according to claim 4 in which the core material carrying said inner coating in the form of an aqueous dispersion is mixed simultaneously with an aqueous alkaline solution of a silicate and a mineral acid in amounts such that the pH is maintained at a value greater than 8 to deposit said dense amorphous silica.

12. A process according to claim 4 in which the temperature is maintained at a value of from 70° C. to 90° C. and the pH at a value of from 9 to 10.5 during deposition of said dense amorphous silica.

* * * * *